United States Patent [19]

Yoshio et al.

[11] 4,133,864

[45] Jan. 9, 1979

[54] PROCESS FOR PREPARING TITANIUM DIOXIDE

[75] Inventors: Kosaki Yoshio, Kita; Yagi Katsumi, Hikashi; Kura Yasuo, Osaka, all of Japan

[73] Assignee: Dong Hwa Titanium Industrial Co., Seoul, Rep. of Korea

[21] Appl. No.: 889,405

[22] Filed: Mar. 23, 1978

[30] Foreign Application Priority Data

Mar. 29, 1977 [KR] Rep. of Korea .................... 77-761

[51] Int. Cl.$^2$ .............................................. C01G 23/06
[52] U.S. Cl. ........................................ 423/85; 423/616
[58] Field of Search ................... 423/615, 616, 85

[56] References Cited

U.S. PATENT DOCUMENTS

| | | | |
|---|---|---|---|
| 1,773,727 | 8/1930 | Farup | 423/615 |
| 1,795,467 | 3/1931 | Blumenfeld | 423/616 |
| 1,959,765 | 5/1934 | Saklatwalla | 423/615 |
| 3,501,271 | 3/1970 | Twist et al. | 425/85 |

FOREIGN PATENT DOCUMENTS

| | | | |
|---|---|---|---|
| 116701 | 3/1943 | Australia | 423/85 |
| 610334 | 12/1960 | Canada | 423/85 |
| 456544 | 11/1936 | United Kingdom | 423/615 |

*Primary Examiner*—Brian Hearn
*Attorney, Agent, or Firm*—Armstrong, Nikaido, Marmelstein & Kubovcik

[57] ABSTRACT

Titanium dioxide of improved properties for use as a pigment is obtained by a process in which a non-concentrated acid solution containing not more than 200 grams of $TiO_2$ per liter of solution is partially hydrolyzed and filtered; and additional acid solution slowly added with heating to hydrolyze the remaining $TiO_2$ and give a product which, on calcining has a color index of about 1500.

3 Claims, No Drawings

PROCESS FOR PREPARING TITANIUM DIOXIDE

BACKGROUND OF THE INVENTION

This invention relates to a process for preparing titanium dioxide and, more particularly, to an improved process for preparing titanium dioxide by directly hydrolyzing a sulfuric acid solution of ilmenite ore without previously concentrating the acid solution of the ore.

In addition to other uses, titanium dioxide is used in considerable quantities throughout the world as a pigment for paints. In order to be satisfactory for use in this manner, it is important that the particle size of the titanium dioxide be carefully controlled. Accordingly, the prior art has developed procedures for controlling the particle size of titanium dioxide derived from various sources such as the ore ilmenite.

Generally, titanium dioxide is obtained from ilmenite ore by dissolving the ore in a quantity of sulfuric acid and then hydrolyzing the solution to precipitate the titanium dioxide. Frequently, in these procedures, in order to remove ferric sulfate, which is present in the solution, prior to hydrolysis, the solution is concentrated in order that there will be more than 200 grams/liter of titanium oxide present and then the concentrated solution hydrolyzed. This procedure of first concentrating the titanium oxide solution prior to hydrolysis is particularly important also because it has been found that without this prior concentration, the titanium dioxide which is obtained is not generally of good quality and suitable for use as a pigment since its particle size cannot be controlled.

It is accordingly an object of the present invention to produce titanium dioxide of carefully controlled particle size suitable for use as a pigment using a technique which not only results in superior properties for the titanium dioxide, but avoids the practice recognized in the prior art for first concentrating the titanium dioxide in acid solution prior to hydrolysis.

DETAILED DESCRIPTION OF THE INVENTION

According to the present invention, titanium dioxide of consistent and superior particle size is obtained from a nonconcentrated solution containing less than 180 grams/liter of titanium oxide in a sulfuric acid solution by first heating the non-concentrated solution to about its boiling point for one to two hours until the degree of hydrolysis reaches between about 10 to 20%. At this point, the partially hydrolyzed solution of titanium dioxide is filtered to remove large white filterable particles of titanium dioxide which have formed, thereby producing an almost clear filtrate. The filtrate which is obtained from this filtration procedure may then be heated again to bring about further hydrolysis followed by slow addition of an additional non-hydrolyzed and non-concentrated sulfuric acid solution of titanium dioxide to the filtrate over a period of about 5 to 8 hours while maintaining the temperature of the solution at about 90° C. to boiling. Alternatively, the almost clear filtrate may not be further hydrolyzed by heating directly but rather the additional non-hydrolyzed and non-concentrated sulfuric acid solution of titanium dioxide may be added directly while the temperature is maintained at 90° C. to boiling over the 5-8 hour period. Eventually the total amount of freshly added titanium dioxide solution to the filtrate is in an amount of 6-8 parts of fresh solution to 1 part of filtrate.

This procedure results in a slow and consistent further hydrolysis of the titanium dioxide with control of the resulting particle size. According to the present invention, when the particles of titanium dioxide are slowly grown in the filtrate, the size increase of the particles is in proportion to the added amount of additional non-concentrated solution. The titanium dioxide particles which are obtained according to this process can be easily filtered and washed with water and give a color index in the order of 1500 or greater as opposed to 1250 which is frequently obtained by conventional procedures of the prior art.

EXAMPLE

A non-concentrated mother liquor containing an aqueous solution of 152.7 grams/liter titanium dioxide, 3 grams/liter $Ti_2O_3$, 71 grams/liter FEO, 92.9 grams/liter free $H_2SO_4$ and 377.3 grams/liter of total $H_2SO_4$ was adjusted to a concentration of 130 grams/liter of titanium dioxide and heated to 100° C. At 18.5% hydrolysis of the titanium dioxide, large particles of titanium dioxide had formed. The heating was discontinued and after 90 minutes cooling, the solution was filtered to remove the large particles of titanium dioxide which had formed. The The filtrate which was obtained was then further heated to a temperature of about 90° C. to form a hydrolyzed seeding solution. 500cc of this seeding solution was placed in a flask and further heated to about 90° C. and 3 liters of fresh non-concentrated mother liquor of the same composition as the mother liquor originally employed was added to the 500cc of seeding solution over a 6-hour period by slowly dropping the fresh solution into the seeding solution. During this period of time, the temperature was maintained at about 90°-100° C. and further hydrolysis occurred. At the conclusion of the six-hour period, the hydrolyzed product was filtered and washed with water, dried and calcined to give titanium dioxide having a color index as measured by a colorimeter of 1595. The final amount of titanium dioxide obtained was 200 kilograms.

We claim:

1. A process for preparing titanium dioxide of controlled particle size which comprises:
   heating an aqueous sulfuric acid solution containing not more than 200 grams of $TiO_2$ per liter of solution until the degree of hydrolysis is about 10 and 20% and forms precipitate filterable particles thereof;
   filtering said solution to remove said particles of $TiO_2$ and give an almost clear filtrate;
   further hydrolyzing said filtrate and slowly adding 6-8 parts by volume of said original aqueous acid solution of $TiO_2$ per 1 part of filtrate; and
   recovering a hydrolyzed precipitate which can be calcined to give $TiO_2$ having a color index of 1500 or greater.

2. The process of claim 1 wherein said acid solution of $TiO_2$ is heated for about 1-2 hours at about 90° C. to boiling.

3. The process of claim 1 wherein said further hydrolysis is accomplished by heating at about 90° C. to boiling and said addition of aqueous, acid $TiO_2$ solution is carried out over a 5-8 hour period.

* * * * *